US012503912B1

(12) United States Patent
Ulsh et al.

(10) Patent No.: US 12,503,912 B1
(45) Date of Patent: Dec. 23, 2025

(54) WINDOW SCREEN ASSEMBLY WITH DUAL SIDE EXPANDERS TO REDUCE MEASUREMENTS AND ACCURACY NEEDED FOR SELECTION/INSTALLATION

(71) Applicant: THE RITESCREEN COMPANY, LLC, Elizabethville, PA (US)

(72) Inventors: Steven E. Ulsh, Elizabethville, PA (US); John C. St. Clair, Ashville, PA (US)

(73) Assignee: THE RITESCREEN COMPANY, LLC, Elizabethville, PA (US)

( * ) Notice: Subject to any disclaimer, the term of this patent is extended or adjusted under 35 U.S.C. 154(b) by 95 days.

(21) Appl. No.: 18/131,378

(22) Filed: Apr. 6, 2023

Related U.S. Application Data

(60) Provisional application No. 63/327,876, filed on Apr. 6, 2022.

(51) Int. Cl.
*E06B 9/52* (2006.01)

(52) U.S. Cl.
CPC ........ *E06B 9/522* (2013.01); *E06B 2009/527* (2013.01)

(58) Field of Classification Search
CPC ........ E06B 9/52; E06B 9/24; E06B 2009/527; E06B 9/522
See application file for complete search history.

(56) References Cited

U.S. PATENT DOCUMENTS 78,541 A 6/1868 McCluskey
184,405 A * 11/1876 McArthur ............... E06B 9/522 160/226
246,153 A 8/1881 Koch
266,246 A 10/1882 Willer
268,491 A 12/1882 Hubbell
514,654 A 2/1894 Higgin
690,662 A 1/1902 Perrin
(Continued)

FOREIGN PATENT DOCUMENTS

JP H04306392 A 10/1992

OTHER PUBLICATIONS

Press Fit Forces Stress Design Calculator, Jun. 18, 2018, available at: www.engineersedge.com/calculators/machine-design/press-fit/press-fit.htm.
(Continued)

*Primary Examiner* — Abe Massad
(74) *Attorney, Agent, or Firm* — Sprinkle IP Law Group

(57) ABSTRACT

A screen assembly is configured to permit installation in various different sized windows having various different window socket dimensions. The screen assembly includes: a frame, a mesh secured to the frame, at least one expander member, and a biasing member, which may be a spring. The expander member is mounted to a first side of the frame, and configured to slide with respect to the frame between a fully retracted position, a fully extended position, and a plurality of intermediate positions. The biasing member biases the expander member toward the fully extended position. The range of sliding distances for the expander member relative to the fixed frame portion thereby provides a variable lateral extent for the screen assembly permitting its installation into various different sized windows having various different window socket dimensions.

9 Claims, 17 Drawing Sheets

(56) References Cited

U.S. PATENT DOCUMENTS 724,682 A 4/1903 Eastman
792,833 A 6/1905 Lee
996,941 A * 7/1911 Reitz ........................ E06B 9/522 160/224
1,010,700 A 12/1911 Steger
1,025,256 A 5/1912 Faber
1,038,367 A 9/1912 Henry
1,042,380 A 10/1912 Baker
1,047,828 A 12/1912 Morgner
1,058,616 A 4/1913 Maze
1,135,352 A 4/1915 Bunger
1,178,219 A 4/1916 Gramer
1,187,402 A 6/1916 Traut
1,260,589 A 3/1918 Steger
1,352,372 A * 9/1920 Kessler ................... E06B 9/522 160/375
1,423,021 A 7/1922 Reynolds
1,435,270 A * 11/1922 Wagner ..................... E06B 9/52 49/421
1,436,858 A 11/1922 Burhen
1,453,280 A * 5/1923 Park .......................... E06B 9/52 49/431
1,653,184 A 12/1927 Kolumbus
1,678,941 A 7/1928 Helman
1,697,768 A 1/1929 King
1,733,877 A 10/1929 Higgin
1,736,688 A 11/1929 Yerby
1,737,944 A * 12/1929 Pollack ..................... E06B 9/52 49/421
1,745,818 A 2/1930 Trombly
1,760,612 A 5/1930 Trott
1,794,956 A 3/1931 Heath
1,798,187 A * 3/1931 Brouillette ................ E06B 9/52 160/376
1,807,425 A 5/1931 McCalmon
1,824,897 A 9/1931 Johnson
1,856,323 A 5/1932 Feaster
1,879,377 A 9/1932 McNeely
1,883,999 A * 10/1932 Levi .......................... E06B 9/52 160/381
1,918,660 A * 7/1933 Norquist ................... E06B 9/52 160/381
1,947,307 A 2/1934 Rafton
1,959,136 A 5/1934 Miller
1,977,165 A 10/1934 Williams
1,997,713 A 4/1935 Boehm
1,997,740 A 4/1935 Nickerson
2,049,831 A * 8/1936 Cruickshank ............. E06B 9/52 160/376
2,052,467 A 8/1936 Hermann
2,079,718 A 5/1937 Sgritta
2,082,513 A 6/1937 Roberts
2,126,544 A 8/1938 Everhard
2,197,489 A 4/1940 Trulock
2,204,761 A 6/1940 Lang
2,207,198 A * 7/1940 Herman .................... E06B 9/52 160/180
2,265,375 A 12/1941 Julien
2,274,700 A 3/1942 Jenks
2,297,729 A 10/1942 Thomas
2,334,432 A * 11/1943 Morfy ....................... E06B 9/52 160/376
2,396,295 A * 3/1946 Spraragen ................. E06B 9/52 160/40
2,444,288 A 6/1948 Gilson
2,511,239 A 6/1950 Behnke
2,523,383 A 9/1950 Majkrzak
2,532,886 A 12/1950 Bianchi
2,537,109 A 1/1951 Willett
2,597,484 A * 5/1952 Heilig ....................... E06B 9/52 160/381
2,598,770 A 6/1952 Drozt
2,612,947 A 10/1952 Jenks
2,619,168 A 11/1952 Leverence
2,625,217 A 1/1953 Spiller
2,670,079 A 2/1954 Betts
2,695,664 A 11/1954 Delegard
2,702,596 A 2/1955 Morrow
2,720,950 A 10/1955 Rick
2,722,978 A 11/1955 Frisk
2,723,032 A 11/1955 Gisler
2,759,538 A 8/1956 Long
2,774,477 A 12/1956 Pollitz
2,797,750 A 7/1957 Van Dette
2,835,325 A 5/1958 Gilbert
2,870,882 A * 1/1959 Tolman ................. E06B 3/9685 160/90
2,897,889 A 8/1959 Kessler
2,902,165 A 9/1959 Imershein
2,914,123 A 11/1959 Deuble
2,989,788 A 6/1961 Kessler
3,002,557 A 10/1961 Roth
3,057,401 A 10/1962 Gomory
3,107,991 A 10/1963 Taussig
3,176,843 A 4/1965 Hoskins
3,214,314 A 10/1965 Rowbottom
3,220,469 A 11/1965 Oehmig
3,255,810 A 6/1966 Rowbattam
3,276,513 A 10/1966 Lemelson
3,321,885 A 5/1967 Pratt
3,341,013 A 9/1967 Moulton
3,374,597 A 3/1968 Whitener
3,455,367 A 7/1969 Tarte
3,477,574 A 11/1969 Malfroy
3,679,057 A 7/1972 Perez
3,716,138 A 2/1973 Lumsden
3,760,860 A 9/1973 Kelarakis
4,033,865 A 7/1977 Derrick
4,232,310 A 11/1980 Wilson
4,311,183 A 1/1982 Herbst
4,502,260 A 3/1985 Machler
4,568,455 A 2/1986 Huber
4,570,406 A 2/1986 DiFazio
4,968,366 A 11/1990 Hukki
5,032,210 A 7/1991 Hukki
5,039,246 A 8/1991 Woodruff
5,046,546 A 9/1991 Benedyk
5,090,469 A 2/1992 Boulanger
5,137,622 A 8/1992 Souter
5,151,149 A 9/1992 Swartz
5,469,906 A 11/1995 Cason
5,540,019 A 7/1996 Beske
5,547,011 A 8/1996 Dotson
5,594,418 A 1/1997 Martin
5,666,773 A 9/1997 Librande
5,718,791 A 2/1998 Spengler
5,775,400 A 7/1998 Wilkinson
5,787,657 A 8/1998 Librande
5,794,328 A 8/1998 Simone
5,794,528 A 8/1998 Gronig
5,797,223 A 8/1998 Shoup
5,851,393 A 12/1998 Carr
6,073,675 A 6/2000 Dannaher
6,108,997 A 8/2000 Blais
6,276,426 B1 8/2001 Polak
6,279,644 B1 8/2001 Wylie
6,331,223 B1 12/2001 Wylie
6,450,345 B1 9/2002 Adams
6,565,698 B1 5/2003 Adams
6,669,985 B2 12/2003 Adams
6,672,365 B2 * 1/2004 Therrien ................... E06B 9/52 160/381
6,736,270 B2 5/2004 Adams
6,742,565 B2 6/2004 Badley
6,964,290 B2 * 11/2005 Woodward .............. E06B 3/302 160/90
6,977,021 B2 12/2005 Annacchino
6,991,693 B2 1/2006 Wylie
7,007,735 B1 3/2006 Lake
7,740,048 B2 6/2010 Wilson
7,861,473 B1 1/2011 Green
8,042,598 B2 10/2011 Bredemus
8,056,602 B1 11/2011 Green

(56) References Cited

U.S. PATENT DOCUMENTS

| | | | |
|---|---|---|---|
| 8,191,606 | B2 | 6/2012 | Edlin |
| 8,871,050 | B2 | 10/2014 | Blot |
| 8,919,826 | B2 | 12/2014 | Small |
| D727,539 | S | 4/2015 | Alexander |
| 9,157,271 | B2 | 10/2015 | Burton |
| 9,234,388 | B2 | 1/2016 | Altieri |
| D748,818 | S | 2/2016 | Shen |
| D757,299 | S | 5/2016 | Altieri |
| 9,631,417 | B2 | 4/2017 | Massey |
| 10,994,492 | B2 | 5/2021 | Kraus |
| 2004/0140067 | A1 | 7/2004 | Kelley |
| 2005/0056389 | A1 | 3/2005 | Kelley |
| 2006/0048467 | A1 | 3/2006 | Martineau |
| 2006/0054286 | A1 | 3/2006 | Woodward |
| 2006/0231221 | A1 | 10/2006 | Chen |
| 2014/0290160 | A1 | 10/2014 | Altieri |
| 2014/0290880 | A1 | 10/2014 | Altieri |

OTHER PUBLICATIONS

"Three General Types of Fit," available at www.mmto.org/~dclark/Reports/Encoder%20Upgrade/fittolerences%20%5BRead-Only%5D.pdf, Jul. 8, 2019.

"Engineering Fit," available at: https://en.wikipedia.org/wiki/Engineering_fit, Jul. 8, 2019.

* cited by examiner

FIG. 7B
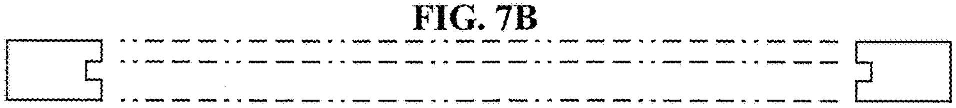
FIG. 7A
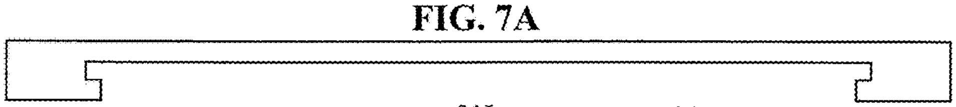
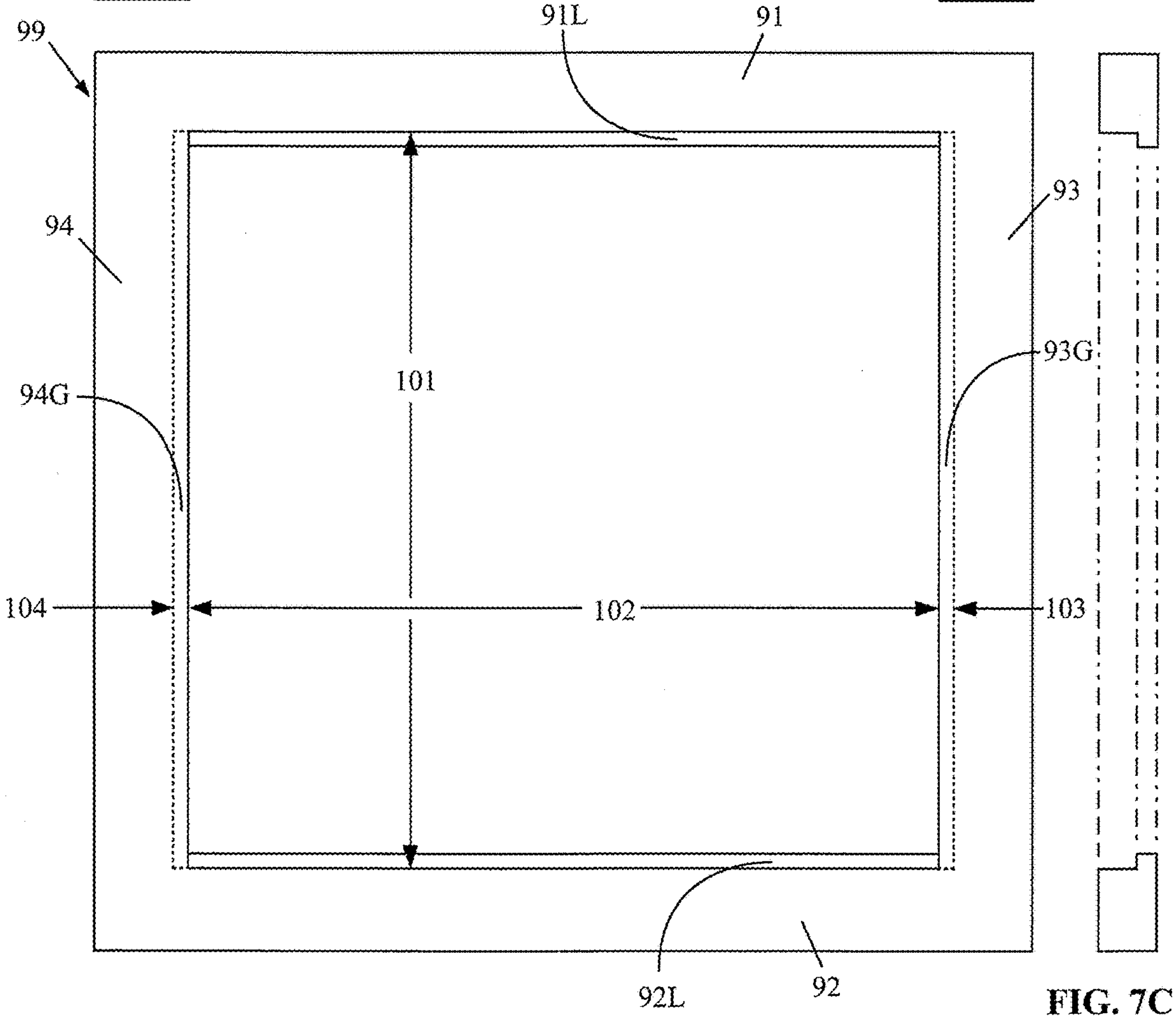
FIG. 7C
FIG. 7

FIG. 10B
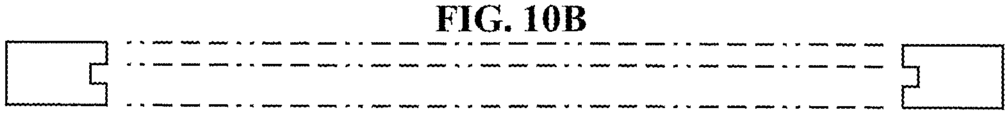
FIG. 10A
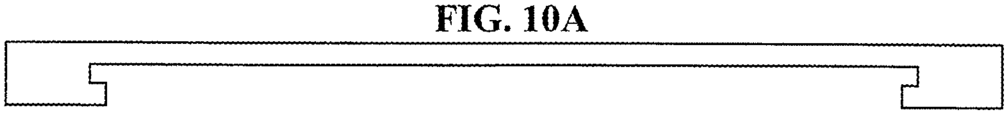
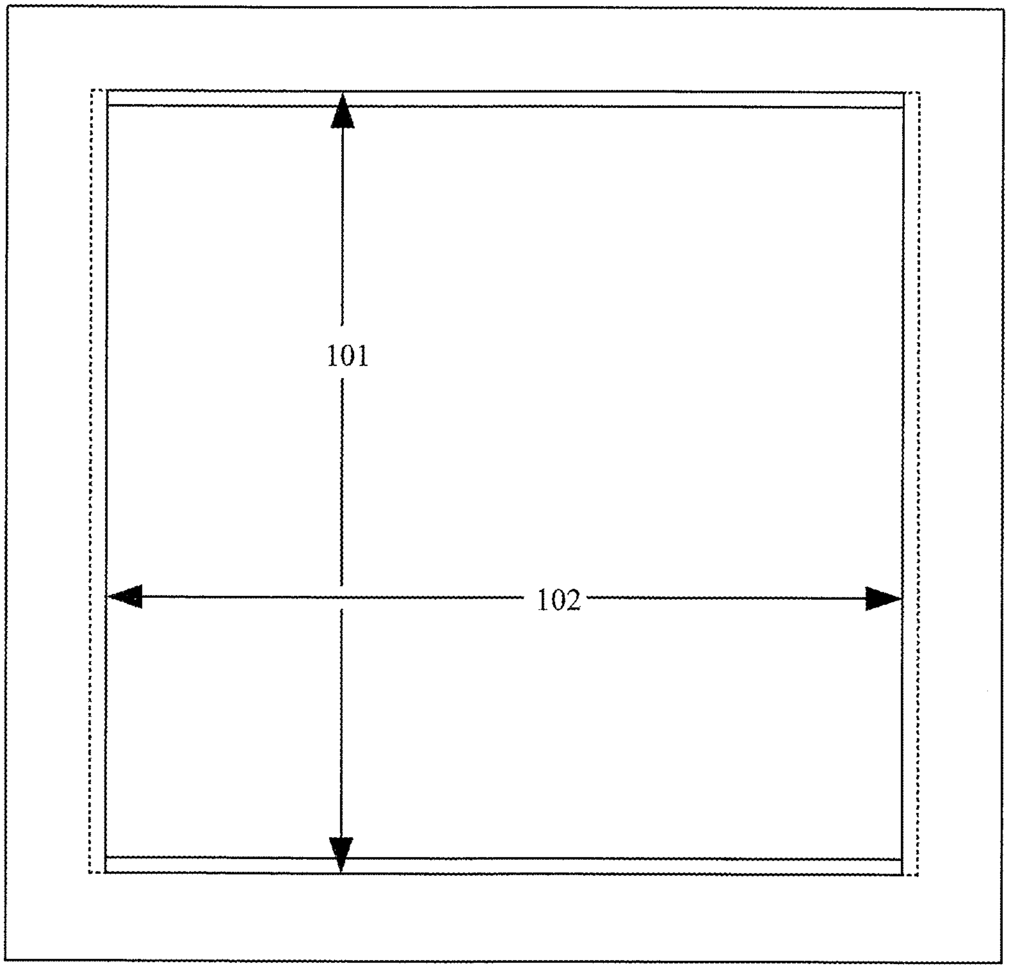
FIG. 8
FIG. 9

FIG. 13
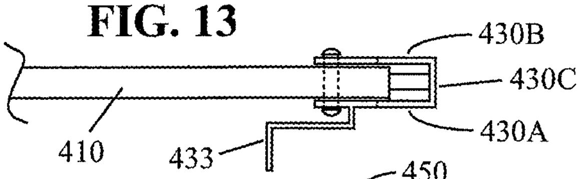
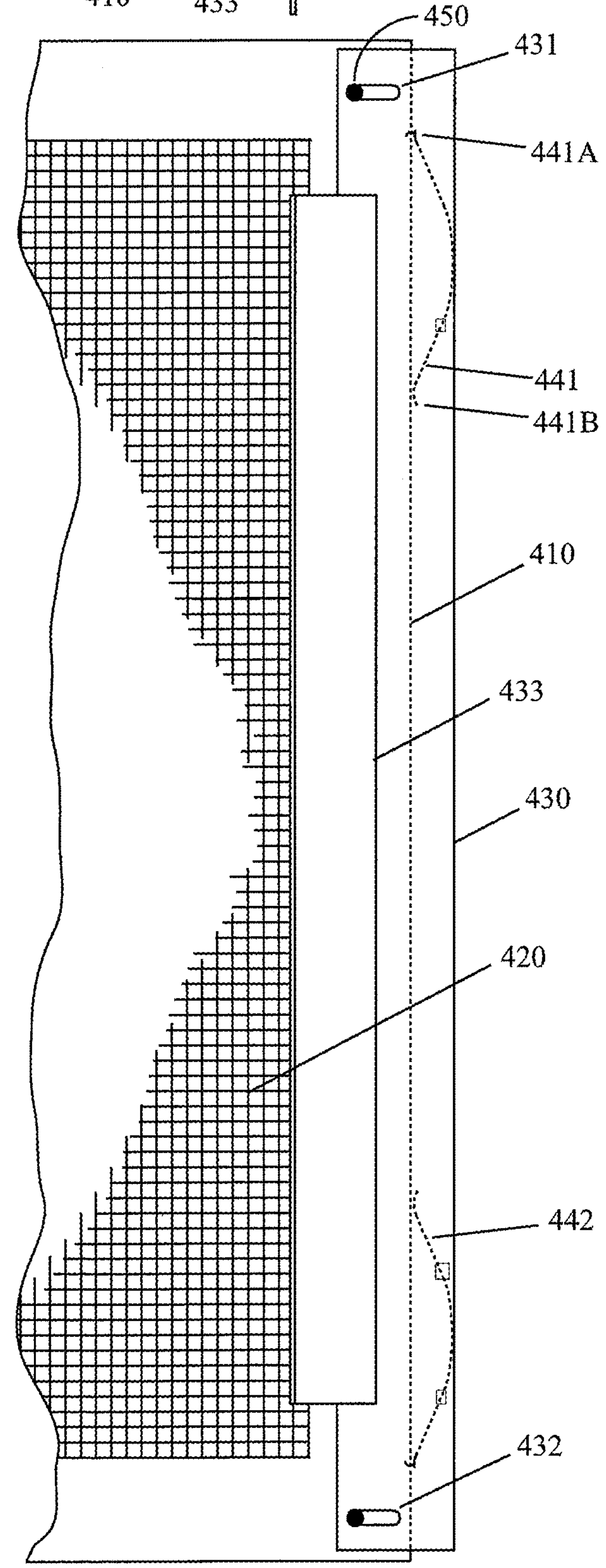
FIG. 12

FIG. 18
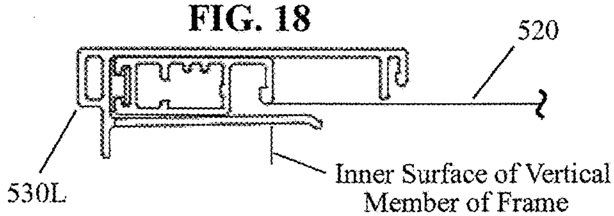
FIG. 17A
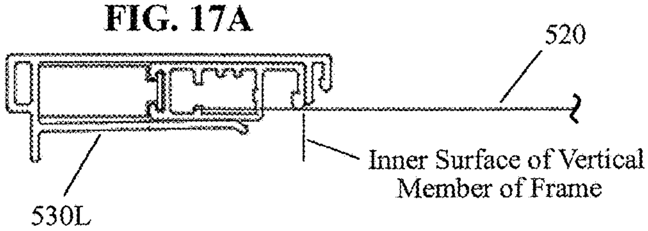
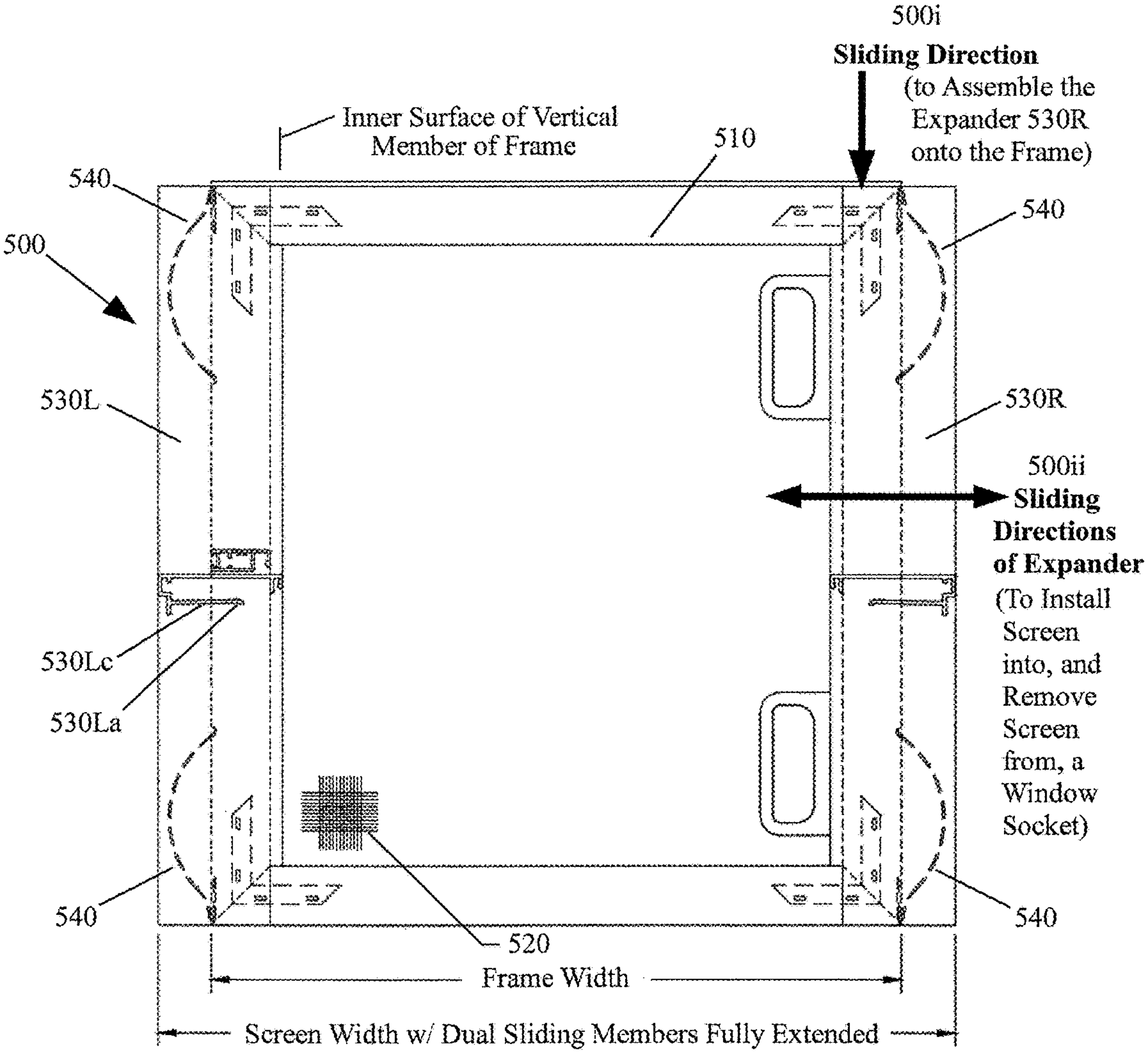
FIG. 17

(Expanded Spring State)

(Compressed Spring State)

(Prior Art Master Window Frame)

WINDOW SCREEN ASSEMBLY WITH DUAL SIDE EXPANDERS TO REDUCE MEASUREMENTS AND ACCURACY NEEDED FOR SELECTION/INSTALLATION

CROSS-REFERENCES

This application claims priority on U.S. Provisional Patent Application Ser. No. 63/327,876, filed on Apr. 6, 2022, the disclosures of which are incorporated herein by reference.

FIELD OF THE INVENTION

The subject technology relates generally to improvements in a removable screen that may be used for windows and doors, and more particularly to an improved screen assembly that can be selected for installation into an existing window (or door) socket with fewer measurements, which also need not be as accurate.

BACKGROUND OF THE INVENTION

Screens that are used in homes and apartments are typically constructed to utilize a rectangular frame (where the window is rectangular shaped), and the screen's frame has a groove cut into t she inward facing side of the frame, with the groove circling around the entire periphery of that side of the frame. A mesh material is typically cut to be slightly larger than the extent of the peripheral groove, and is then overlaid onto that side of the frame. A flexible vinyl "spline" is next overlaid on the screen above the groove, and is pressed into the groove, forcing and retaining the mesh therein. The diameter of the spline, typically 3.6 mm to 4.8 mm, is sized to be retained within the groove, in combination with the thickness of mesh used, in a friction fit. Any protruding excess mesh material may then be trimmed away.

This screen construction must have the vertical and horizontal extent of the rectangular frame be sized to fit the particular dimensions of the master frame of the window or door. Almost all new windows are sold with a screen that is specifically manufactured to fit the corresponding opening in the master frame of that window.

However, very often the current owner purchased his/her home from someone who had removed and discarded a screen that was damaged or which became damaged while being stored indoors during the winter when it may have been replaced by a storm window, and the current owner then needs to purchase a new replacement screen. Additionally, many older homes have windows that did not originally have a corresponding screen, and to provide ventilation without admitting bugs, the owner desires to add a new screen to the old window.

Hiring a professional to come out to a home to measure, build, and install custom replacement screens is very expensive. Moreover, most homeowners are not comfortable with handling a tape measure to try to accurately measure the lateral extent of the opening in the master window frame, while furthermore accounting for the depth of the socket that receives the frame of the screen. Even professionals can make mistakes at such measurements, hence the proverb in the construction industry of measure twice, cut once.

The herein disclosed screen with dual side expanders provides a significant improvement over prior art screens, enabling a homeowner to purchase one that is close to the exact master window frame dimensions, but which nonetheless adjusts to fit without needing to measure the openings carefully, and which provide a clean custom fit look.

The herein disclosed screen assembly with dual side expanders may also be used as a universal screen for installation into a range of different window sizes for new fenestration products.

OBJECTS OF THE INVENTION

It is an object of the invention to provide a screen assembly that may be easily selected, and installed into, the master frame of an old window.

It is another object of the invention to provide a screen that may be purchased for installation into an existing master frame of a window, without having to accurately measure the frame's opening and socket depth.

It is a further object of the invention to provide a screen that may be purchased for installation into a variety of different sized sockets in an existing master frame of a window.

It is another object of the invention to provide a window screen that adjusts to fit a master window frame, and which provide a uniform appearance on the interior and exterior, being centered in the socket.

It is yet a further object of the invention to provide a screen assembly with dual side expanders may also permit universal installation into a range of different socket sizes in a plurality of new fenestration products.

Further objects and advantages of the invention will become apparent from the following description and claims, and from the accompanying drawings.

BRIEF DESCRIPTION OF DRAWINGS

The description of the various example embodiments is explained in conjunction with the following appended drawings.

FIG. 7 is a front view of a master window frame, showing features that typically need to be measured accurately in order to be able to construct a suitably sized screen for the window.

FIG. 7A is a first cross-sectional view taken through the master window frame of FIG. 7.

FIG. 7B is a second cross-sectional view taken through the master window frame of FIG. 7.

FIG. 7C is a third cross-sectional view taken through the master window frame of FIG. 7.

FIG. 8 is the front view of the master window frame shown in FIG. 7, but showing the features that need to be measured in order to be able to construct a suitably sized screen for a window, only one of which needs to be measured accurately.

FIG. 9 is a first cross-sectional view taken through the master window frame of FIG. 8.

FIG. 10A is a second cross-sectional view taken through the master window frame of FIG. 8.

FIG. 10B is a third cross-sectional view taken through the master window frame of FIG. 8.

FIG. 12 is an enlarged detail view showing the right side of the screen assembly of FIG. 11.

FIG. 13 is a top view of the right side of the screen assembly shown in FIG. 12.

FIG. 17 is a front view showing yet another embodiment of a screen assembly, as disclosed herein, having dual side expanders and a dual handle arrangement.

FIG. 17A is a cross-sectional view through one side of the screen assembly of FIG. 17, with the expander shown in the fully extended position.

FIG. 18 is a cross-sectional view through one side of the screen assembly of FIG. 17, with the expander shown in the fully retracted position.

FIG. 20A and FIG. 2B show a cross-sectional view through the screen assembly of FIG. 17, for one particular screen size embodiment, being shown with the springs in the expanded state in FIG. 20A and with the springs in the collapsed state in FIG. 20B.

DETAILED DESCRIPTION OF THE INVENTION

Figure 1:
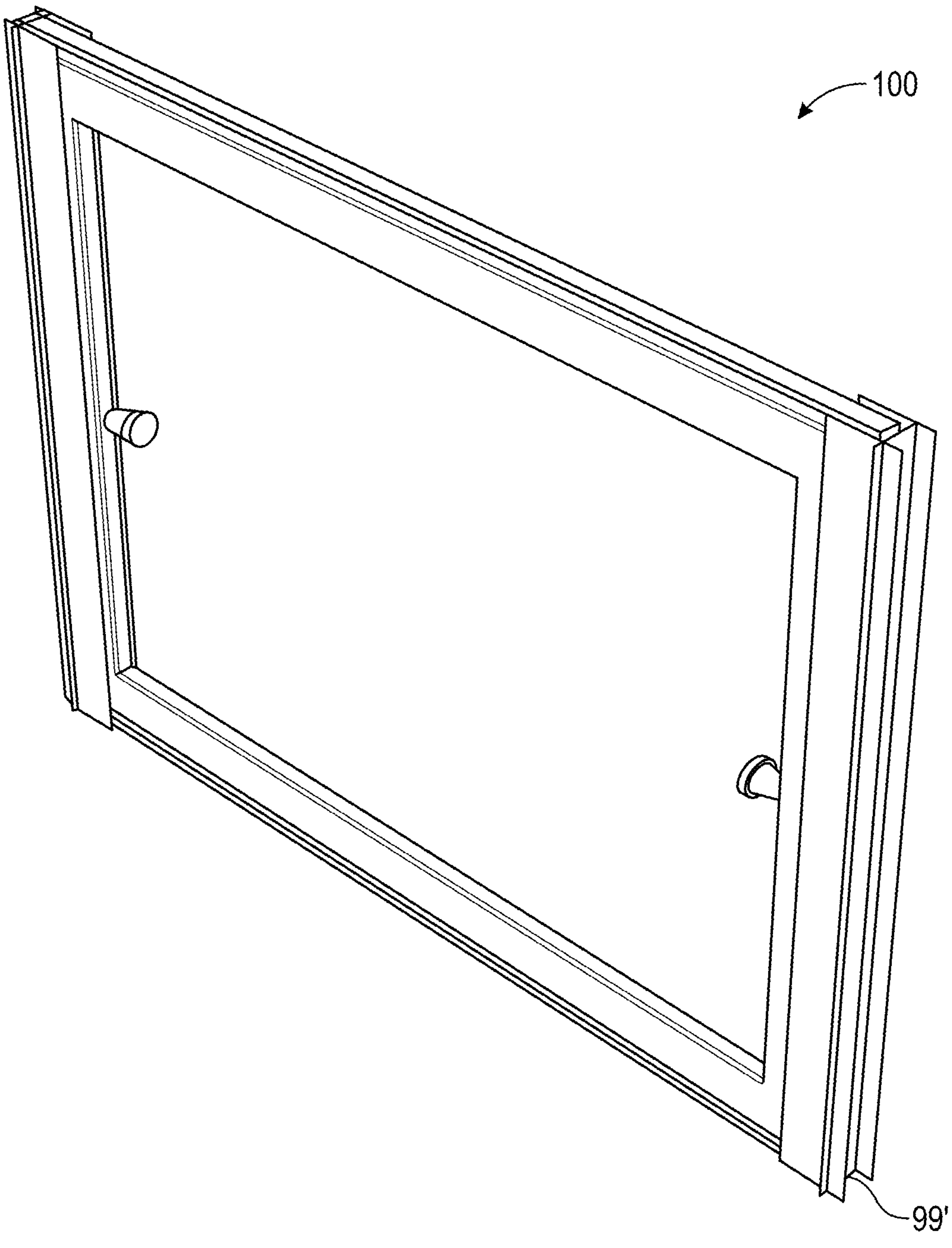
FIG. 1 is a perspective view of a first embodiment of a screen assembly, as disclosed herein, having dual side expanders, shown installed in a portion of the master frame of a window.
Figure 2:
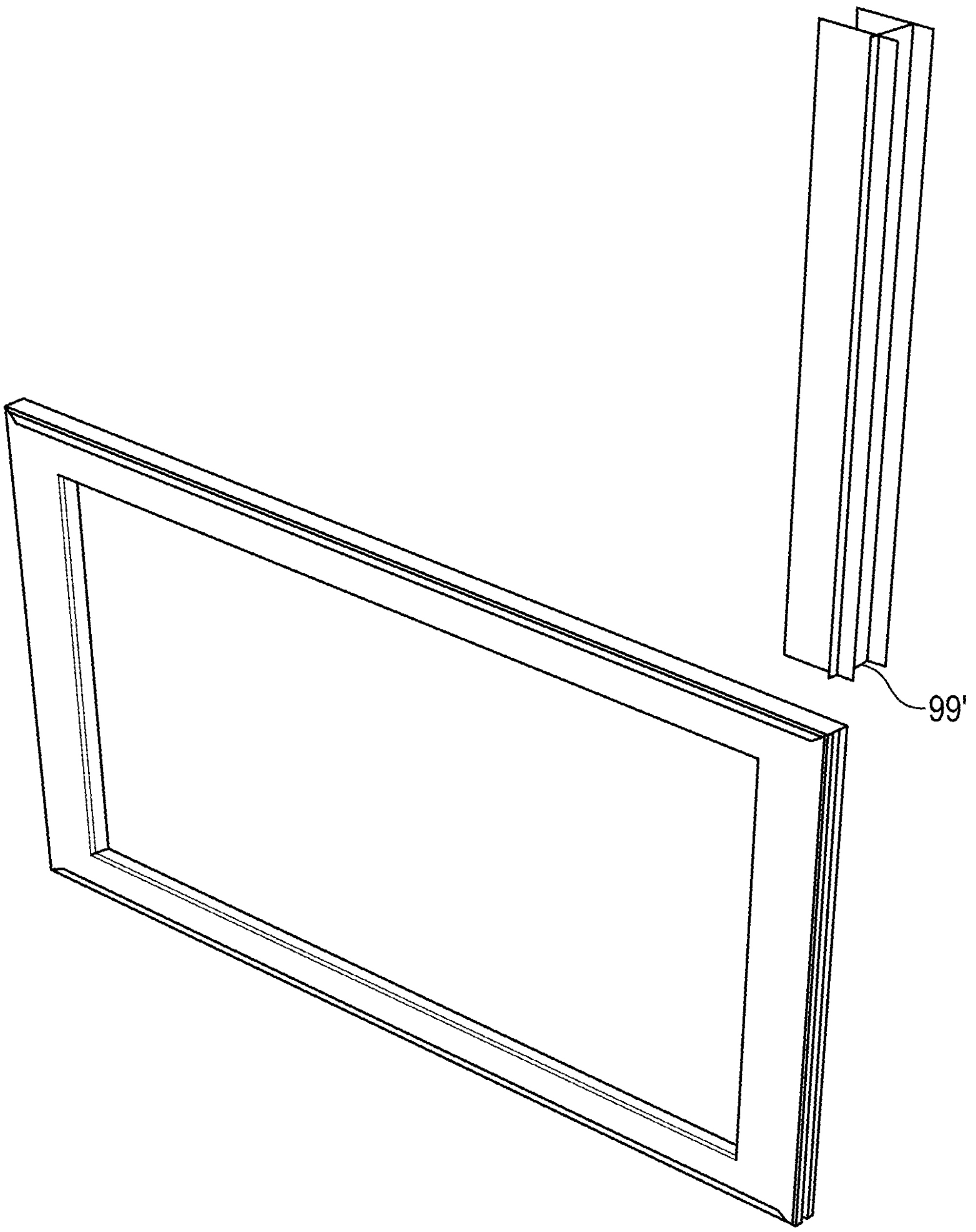
FIG. 2 is a perspective view showing a portion of the screen assembly of FIG. 1, shown prior to being installed in one side of the master frame of the window.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with design variations described in the specification, as well as applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified (see e.g., *Ex Parte Ollmar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Similarly, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: en.wikipedia.org/wiki/Engineering_fit; and "Three General Types of Fit," available at mmto.org/~dclark/Reports/Encoder%20Upgrade/fittolerences%20%5BRead-Only%5D.pdf.

It is further noted that any use herein of relative terms such as "top," "bottom," "upper," "lower," "vertical," and "horizontal" are merely intended to be descriptive for the reader, and may be based on the depiction of those features within the figures for one particular position of the screen assembly, and such terms are not intended to limit the orientation with which the disclosed apparatus may be utilized.

FIGS. 1, 3, 5, 11, and 17 illustrate the herein disclosed window screen assembly with one or more side expander members, which operates to reduce the number of different measurements and the accuracy of those measurements needed in order for a homeowner to select and obtain a screen for an old window, or a window that is missing a screen. Each of those versions of the screen assembly may use the same basic components, but may use different hardware that is grasped by the user to actuate the side expanders into a retracted position for installation into the window or removal therefrom.

Figure 21:
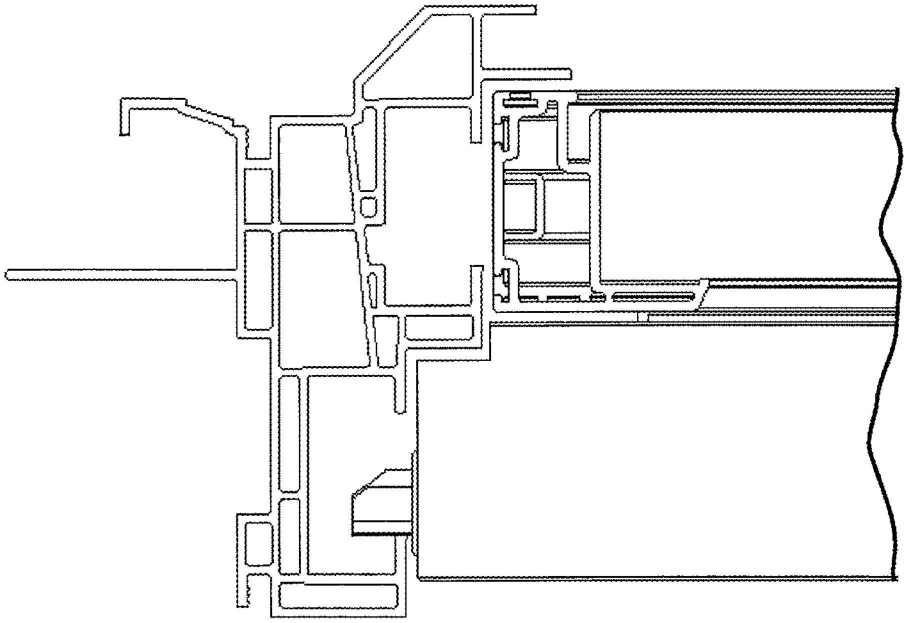
FIG. 21 shows a cross-sectional view of a portion of a prior art master window frame.

Windows are manufactured in many different styles, including, but not limited to: single hung windows, double hung windows, casement windows, awning windows, bay windows, jalousie windows, etc. Many of these types of windows accommodate installation of a screen, being either an exterior screen (used on a first floor window), or an interior screen that is installed from inside the building. Similarly, many doors, particularly a "screen/storm door," accommodate installation of a screen (often by replacement of a storm window in the door with a screen). Therefore, there are many different cross-sectional shapes for these various fenestration products into which a screen may be installed. For example, a screen may be installed in a master frame of a window that holds a sliding sash window member, which sash member has its own frame, and which master window frame may appear to be very complicated to a homeowner needing to take measurements (see e.g., the prior art master window frame shown in FIG. 21). For the purpose of illustrating the functionality of the screen assemblies disclosed herein, a highly simplified master window frame is shown in the front view of FIG. 7, which may be referred to hereinafter simply as a "window frame," with the understanding that the herein disclosed screen assembly may be utilized in any suitable fenestration product.

As seen in FIG. 7, FIG. 7A, and FIG. 7B, a window frame 99 may have an opening defining grooves 91G and 92G having respective landings 91L and 92L (i.e., the bottom-most portion of the groove/socket, which may be planar) on first and second opposite sides (91, 92) of the window frame, with the extent of the landings being separated by a distance shown by the dimension 101. The opening in the frame may also define grooves 93G and 94G having respective landings 93L/94L on third and fourth opposite sides (93, 94) of the frame. The depth of grooves 93G and 94G is respectively shown by the dimensions 103 and 104, and with the opening at the beginning of those two grooves 93G and 94G being separated by a distance shown by the dimension 102.

When a homeowner needs to acquire a screen for the window frame 99 when a pre-existing screen is not available, and if working independently, he/she must necessarily measure the particular openings and obtain the measurements shown by dimensions 101, 102, 103, and 104. The screen acquired for the opening must be formed to have its extent in a first direction correspond to dimension 101, such that it is just incrementally smaller than what is measured, so that the screen will fit into the socket in that direction but not leave a gap that would permit insects to traverse through that gap into the interior of the dwelling. Acquiring measurement for dimension 101 may be straight-forward for many homeowners. However, what is probably more challenging for most homeowners to determine is the extent of the frame that needs to fit between the other two sides, which needs to be formed to be just incrementally smaller than the distance between landing 93L and landing 94L (i.e., it needs to be just smaller than the distance 102+103+104), in order for the frame of the screen to be retained within the grooves (93G, 94G), but also be formed such that the extent of the screen in that direction is larger than the dimension 102 (i.e., so as to not leave a gap in that direction as well). If the frame of the screen is to be securely held and resist being dislodged by slamming of the window or slamming of the screen door into which it may be installed, the extent of the screen in this direction should occupy as much of the groove depths as possible, while still permitting installation of the screen's frame into those two grooves.

The screen is typically installed by initially feeding a portion of a first end of its frame into one of the grooves (e.g., groove 93G), then pivoting the screen so that its frame may lay flush against the landings (91L, 92L), and finally by sliding the second end of the screen's frame into the other groove (i.e., groove 94G).

For the homeowner to select a screen at a store or have a screen manufactured for the opening in window 99 of an old existing window, which more than likely is not a common size, he/she needs to accurately measure the dimensions 102, 103, and 104, and also measure the dimension 101, which measurement-taking is a daunting task for most people.

The herein disclosed screen assembly obviates the need for such accurate measurement taking, as the only two measurements that the do-it-yourself homeowner needs to acquire are dimensions 101 and 102, as seen in FIG. 8, and the accuracy is not critical.

The herein disclosed screen assembly overcomes that problem of needing to take accurate measurements through the use of at least one expander, and more preferably through the use of dual expanders, with one expander member on each side of the frame of the screen.

Figure 5:
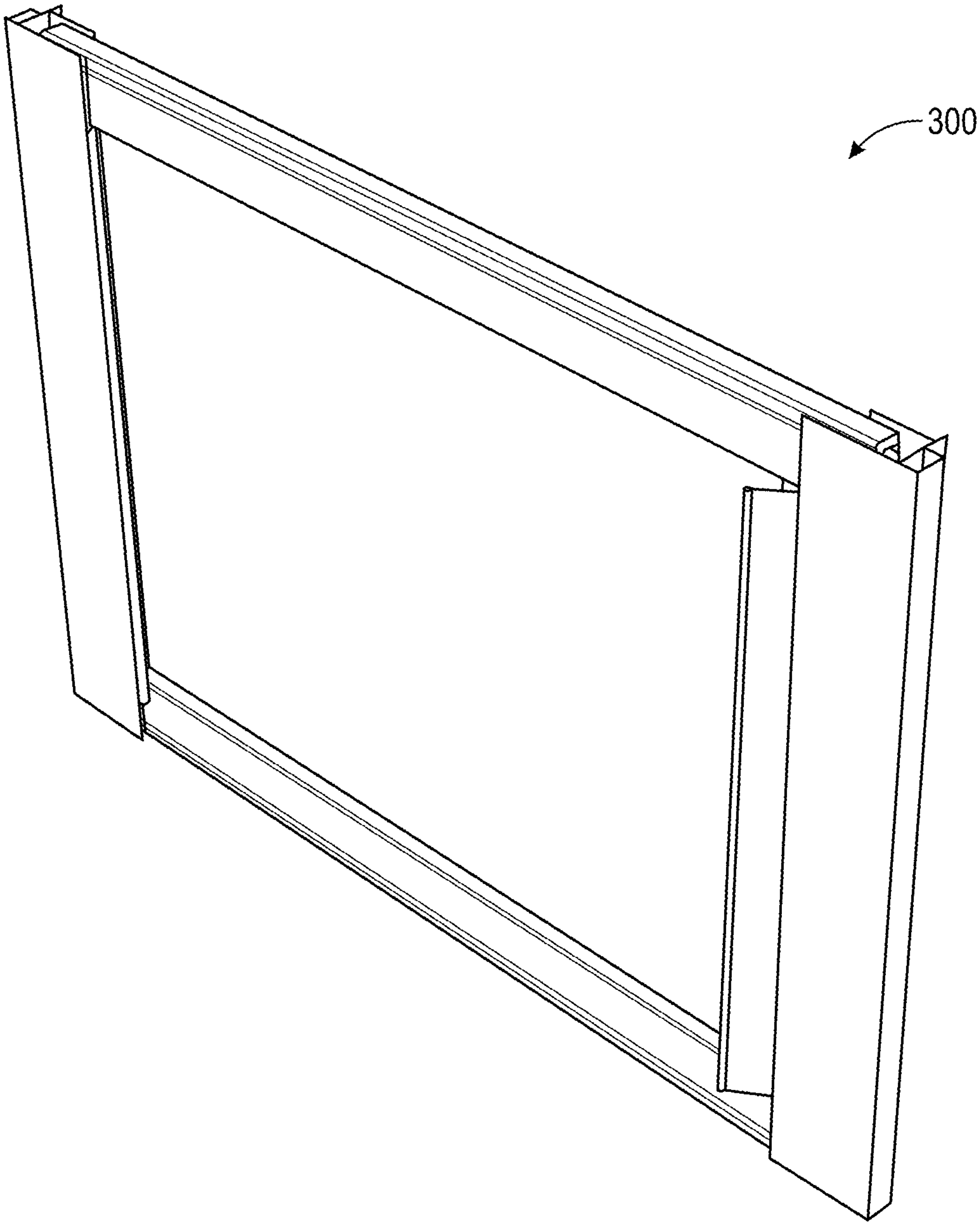
FIG. 5 is a perspective view showing a third embodiment of a screen assembly, as disclosed herein, having dual side expanders, only one of which includes a handle for installation and removal from a master window frame.
Figure 6:
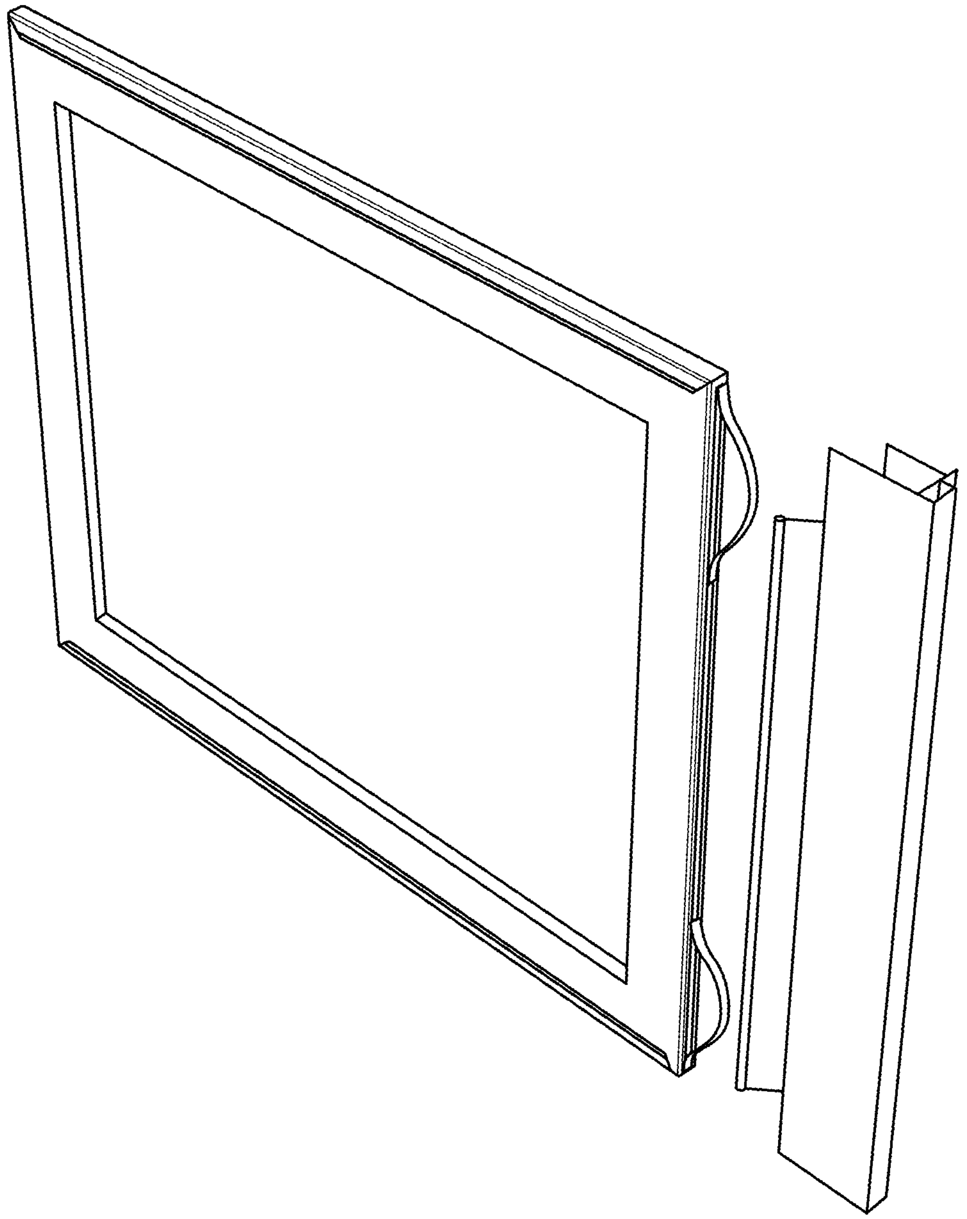
FIG. 6 is an exploded view showing the screen assembly of FIG. 5, shown prior to one of the expanders being slidably attached to the frame of the screen.
Figure 11:
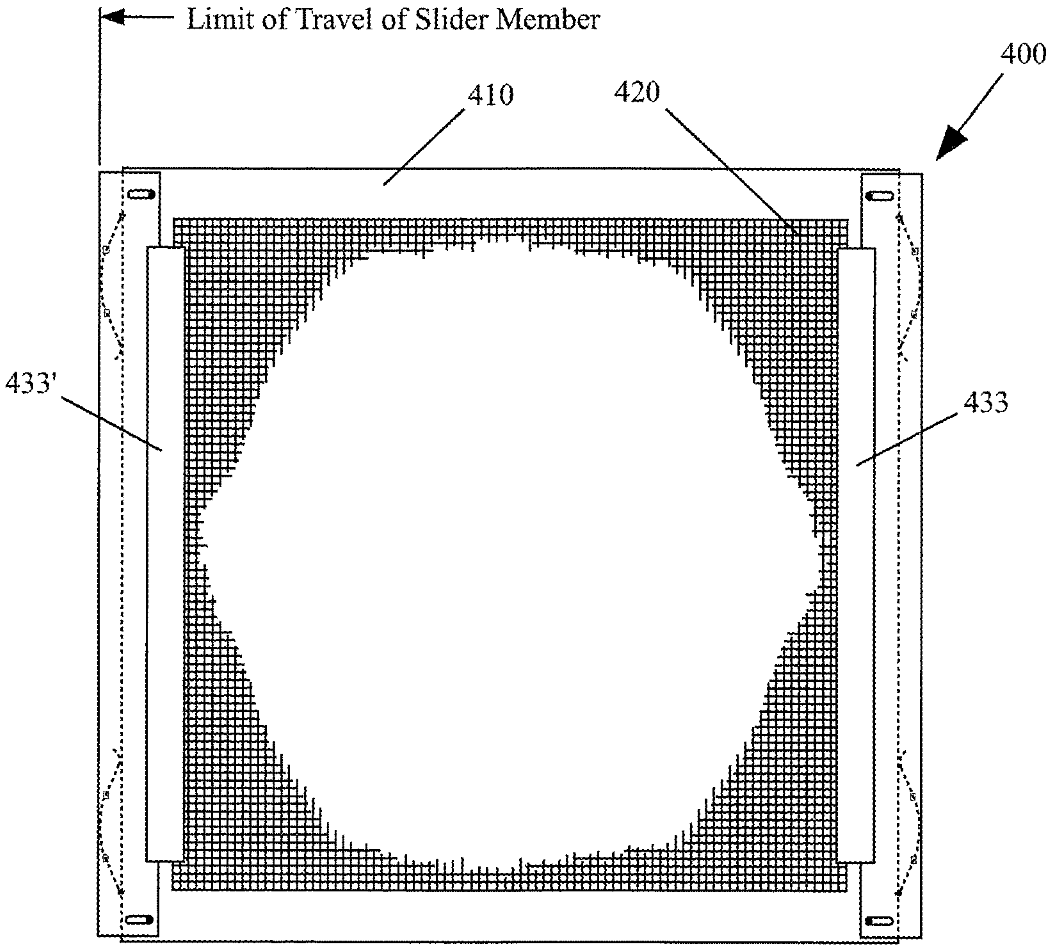
FIG. 11 is a front view showing another embodiment of a screen assembly, as disclosed herein, having dual side expanders.

The screen assembly 400 shown in FIG. 11 is described hereinafter to be illustrative of the common aspects that may also be found in the screen assemblies 100, 200, and 300, shown in FIGS. 1, 3, and 5.

As seen in FIG. 11, the screen assembly 400 may include a frame 410, a piece of mesh material 420 that is secured to the frame, and preferably an expander subassembly on each of its left and right sides. The right side of the screen assembly 400 of FIG. 11 is shown enlarged in FIG. 12, and also in the top view of FIG. 13. (It is noted that the expander subassembly and a suitable biasing structure may be retrofit onto a pre-existing frame 410 to create the screen assembly 400).

As seen in FIG. 12, the expander subassembly may include an expander member 430, and at least one member that is configured to provide biasing. The expander subassembly may also include a track arrangement.

The expander member 430 may be formed to have a length such that it extends along the entire length of the adjacent side of the frame 410 (i.e., being coterminous therewith). Alternatively, as seen in FIG. 12, the expander member 430 may be formed to have a length that may be slightly shorter than the full length of the side of the frame 410. A handle 433 may protrude from one side of the expander member 430, which may be integrally formed with the expander or may be fastened thereto. The expander member 430 may be formed to have any suitable cross-sectional shape, as other shapes/arrangements for the expander subassembly other than what is illustrated are also contemplated herein.

As seen in FIG. 13, the expander member 430 may be formed as a channel section, and may have first and second legs (430A and 430B) that may be of equal length, which may be connected by a shorter third leg 430C. The dimensions of the cross-section of the channel used for the expander member 430 may be formed to slidably receive a portion of the frame 410 therein, which may be received in a slight clearance fit, or even a slight friction fit.

In one embodiment, to guide the desired sliding motion of the expander member 430 relative to the frame 410, a track arrangement may be utilized with respect to those two members. For example, as seen in FIG. 12, a first slotted opening 431 and a second slotted opening 432 may be formed in the leg 430A of the expander member, and corresponding openings may also be formed in the second leg 430B, which corresponding openings may be aligned with the openings in the first leg. One or more pins 450 may be used to slidably mount the expander member 430 relative to the frame 410 at each slotted opening that is utilized (note that while one slotted opening and pin combination being centered on the side of the frame between the two leaf springs may suitably provide for retention of the expander member 430 with respect to the frame 410, two or more would provide for smoother sliding motion therebetween). Any suitable pin may be used. In one embodiment, a bolt and nut may be used as the pin. In another embodiment, a bucket rivet may be used as the pin. In a further embodiment, a post and screw (i.e., a "sex bolt") may be used as the pin. In yet another embodiment, a screw may be driven into the frame through each opening on each side of the expander member 430, where the screw is not torqued to the point of cinching the expander member against the frame, as a gap therebetween would permit the necessary sliding movement. Each screw would independently serve as a pin to enable the directed sliding movement of the expander member 430. It is noted that the arrangement may have only one side of the channel of the expander member pinned to support sliding movement; however, having both sides pinned as shown in FIG. 13 may further provide for more stable sliding movement, and as such may be preferable.

The length and positioning of the slotted openings 431/432 that are utilized may determine the limits of travel that the expander member 430 may experience, depending also upon the spring that is used (i.e., if the spring is configured to fully bias sliding movement of the expander member). The combination of the spring(s) utilized, the positioning of the first end of the slotted opening, and the location of pin 450 in FIG. 11 may result in the pin contacting the end of the opening to limit further biased sliding of the expander member, as indicated therein. As may be seen in FIG. 14, the second end of the slotted opening has not yet contacted the pin 450, and the spring is almost completely compressed, indicating that such total compression of the spring and bottoming out of the expander member with respect to the frame 410 may limit motion of the expander member in that direction; use of a shorter length for the slotted opening, i.e., positioning the right end of the slotted opening further to the left, may instead limit travel of the expander member before bottoming out of the spring occurs, which may be preferable.

Any suitable device that is capable of providing bias may be used, e.g., a charged hydraulic/pneumatic cylinder/actuator, springs, etc. In one embodiment, a single biasing device may be used to provide the biasing, and in another embodiment, two or more biasing devices may be used. A spring, where utilized, may be any suitable spring known in the art, including, but not limited to: a leaf spring, a compression spring, a torsion spring, etc. Merely to be exemplary, two leaf springs (441 and 442) are shown in the arrangement of FIG. 12. The leaf springs (441 and 442) may have a first end 441A secured to the side of the frame 401, and the second end 441B may be disposed in proximity to the side of the frame, but may not being attached thereto, such that it can extend along the side of the frame when compressed. The second end 441B of the spring 441 may curve away from the frame, to permit ease of sliding movement with respect to the side of the frame, and to ensure that it does not gouge the frame when actuated over many cycles, which may tend to diminish the structural integrity of frame 410. The second end 441B of the spring 441 may alternatively be coupled to the side of the frame to slide along that side, e.g., the second end of the spring may have a pin that is configured to slide in a track formed in or added to the side of the frame 410 (not shown), or the second end of the spring may have a slotted opening that tracks along a protruding pin on the frame, etc.

In an arrangement where a single spring is utilized, it may preferably be disposed proximate to the mid-point of the length of the side of the frame 410, as being so positioned may result in less of a tendency of the expander member 430 to bind with respect to the frame 410.

As seen in FIG. 11, the expander subassembly on the left side of the screen assembly 400 may be the mirror image arrangement of the expander subassembly used on the right side, together providing handles 433 and 433'.

Figure 14:
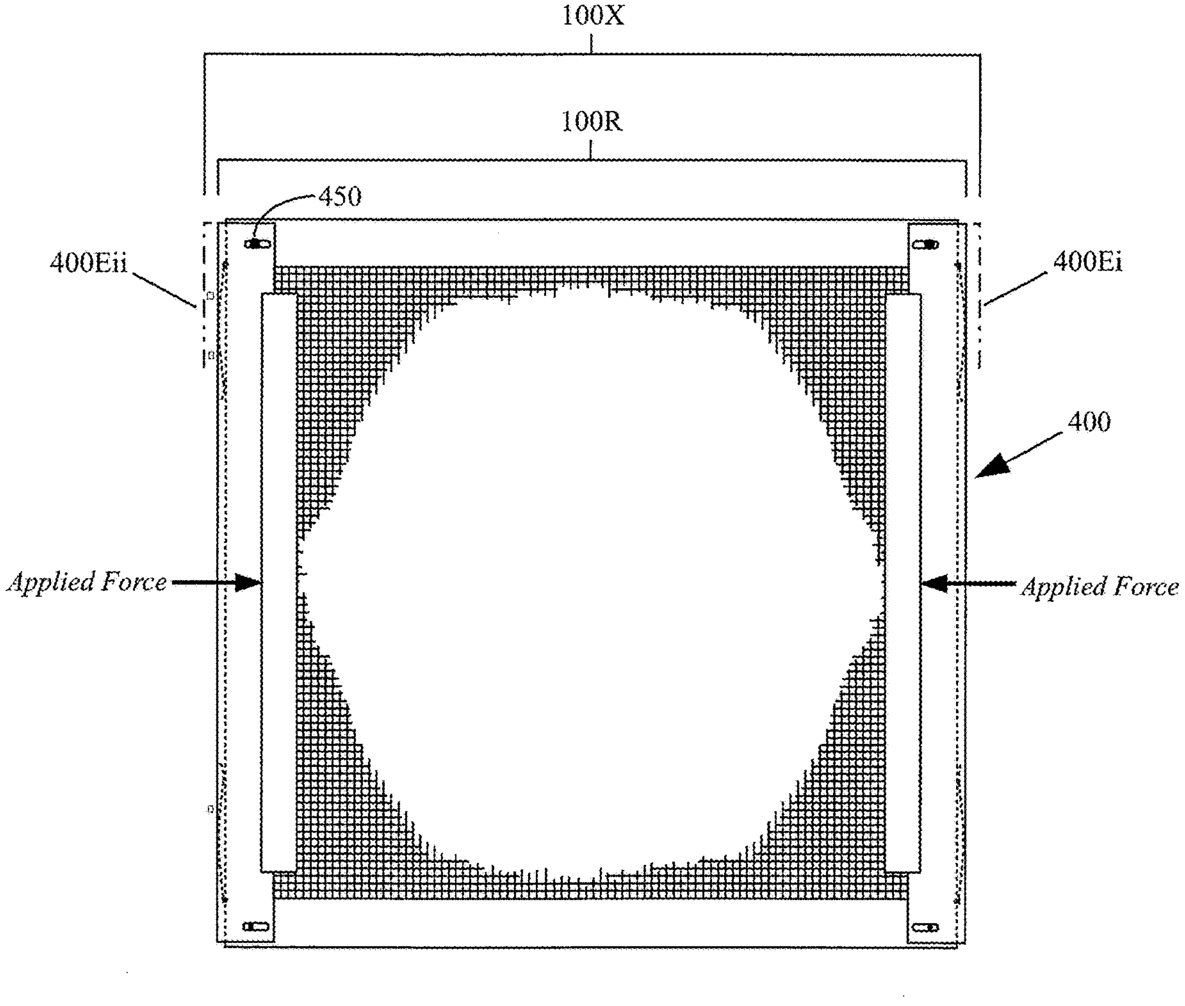
FIG. 14 is the front view of FIG. 11, but shown after a force has been applied to each of the dual expanders, to position each in a fully retracted position, in which the springs are compressed.

As may be understood from comparing the screen assembly 400 shown in FIG. 11 with its appearance in FIG. 14, when the user applies a force to the handles 433 and 433' in the direction indicated by the arrows it will cause the expander members to deform the biasing members to be as shown in FIG. 14. Application of the force by a user to the dual expanders as shown may position each in a fully retracted position, and in which position the springs are compressed and store spring energy. When the user releases the force from the handles 433 and 433', the energy stored by the biasing member(s), e.g., the springs, causes them to return to the unbiased (fully extended) position, which biases the expander members from the positions shown in FIG. 14 back to the extended positions shown in FIG. 11, which extended positions are indicated in FIG. 14 using the phantom lines 400Ei and 400Eii. As seen in FIG. 14, the difference between the distance 100R between the outer sides of the extender members when in the retracted position, versus the maximum distance 100X when released and in the extended position (i.e., lines 400Ei and 400Eii) is roughly indicative of the range of window size openings that may be accommodated by that particular screen assembly. It is only indicative because some portion of the distal ends of each extender member is needed for engagement within the respective sockets of the window (or door). The larger the springs used in conjunction with longer slotted openings 431/432, the greater will be the range of different window openings that may be accommodated by that screen assembly. Merely to be exemplary, in one embodiment, the size of the springs used and the particular length used for the slotted openings 431/432 may be configured to accommodate a one inch range of different openings. As described, other ranges of openings may similarly be provided by varying of the above-noted parameters.

Figure 15:
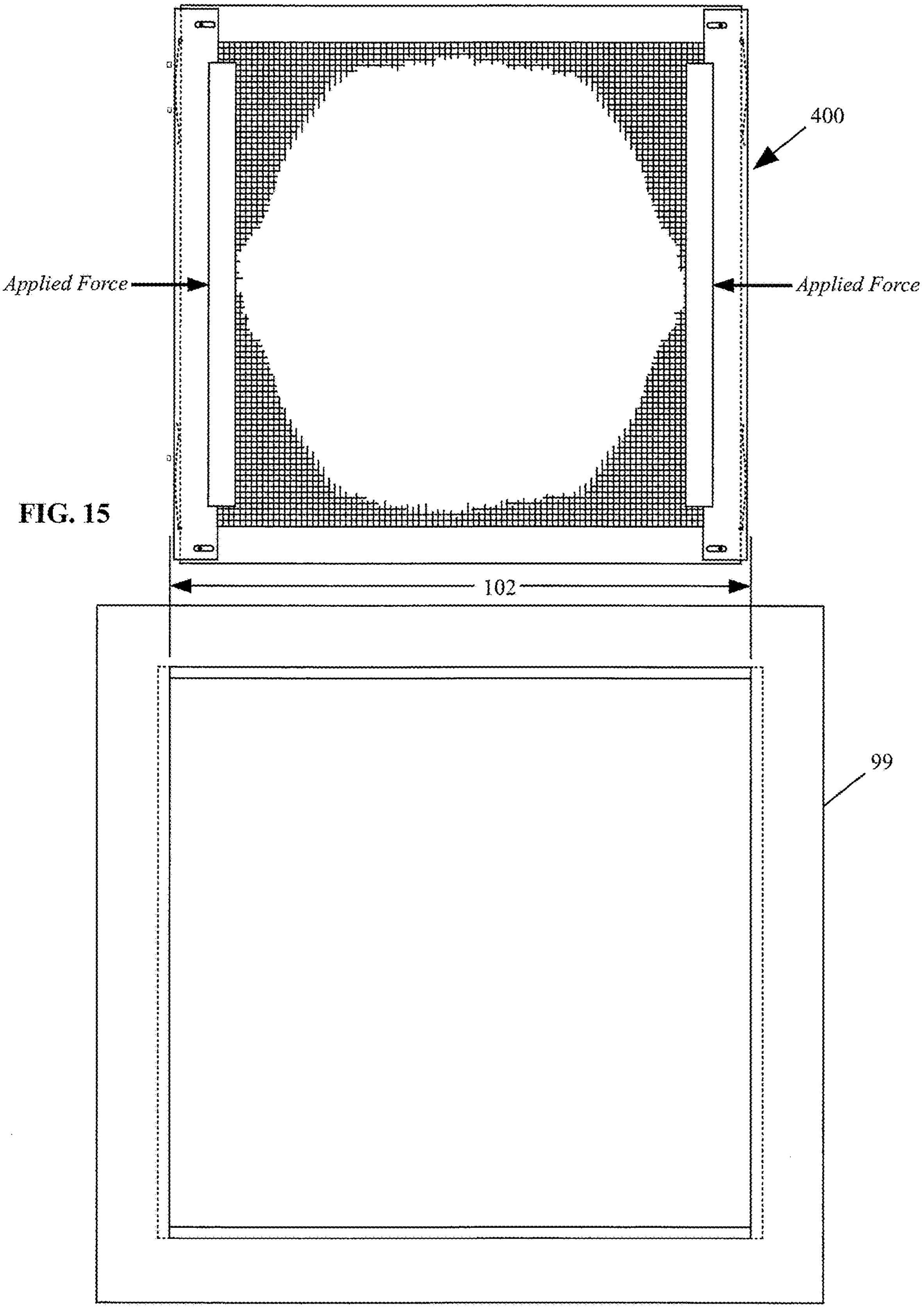
FIG. 15 shows the screen assembly of FIG. 11 just prior to being installed in the master window frame of FIG. 8, with both expander members actuated by a force into the fully retracted position.
Figure 16:
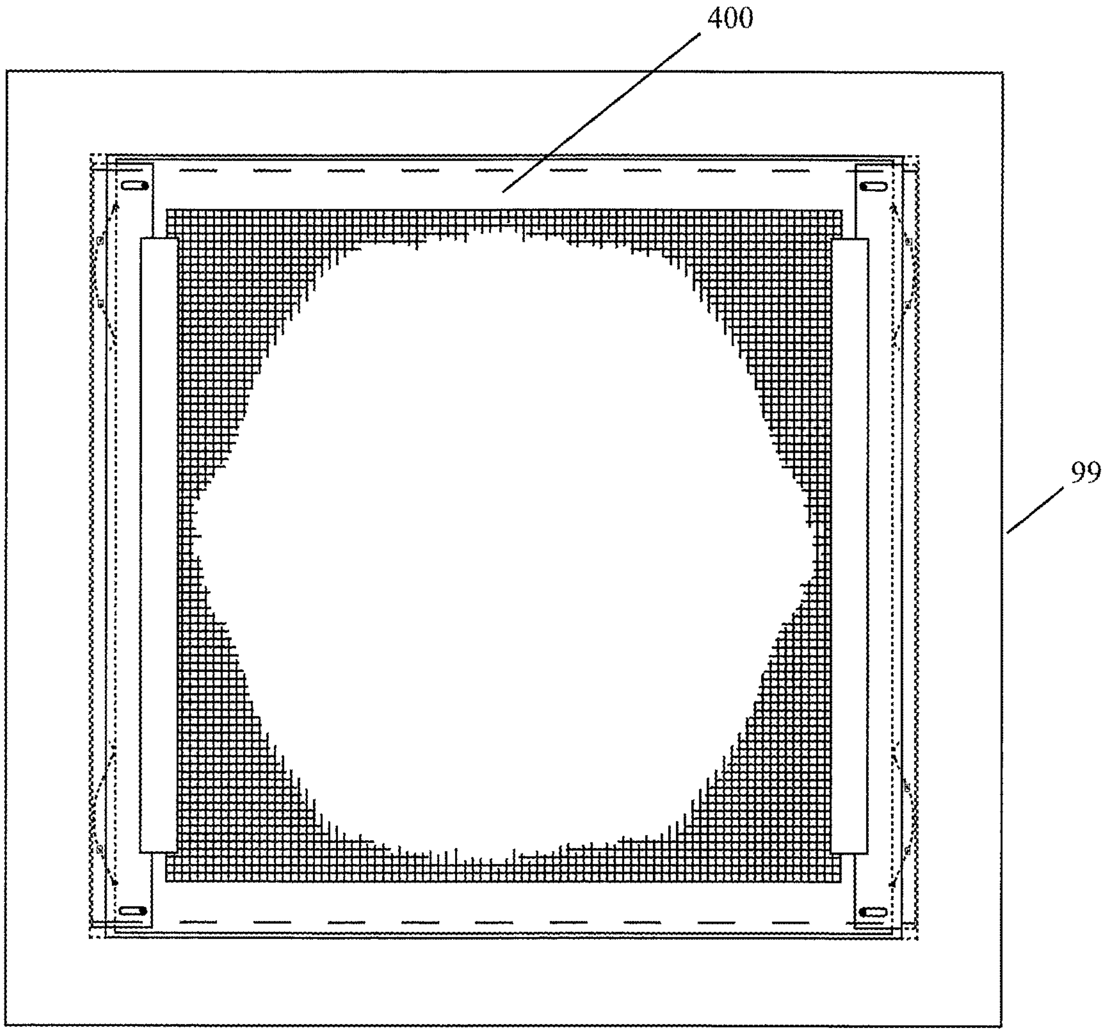
FIG. 16 shows the screen assembly of FIG. 11 after being installed in the master window frame of FIG. 8.

FIG. 15 shows the screen assembly 400 of FIG. 14 just prior to being installed in the window frame 99 of FIG. 8, where both expander members have been actuated by a force into the respective retracted positions; and FIG. 16 shows the screen assembly of FIG. 11 after being installed in the master window frame of FIG. 8.

The screen assembly 100 shown in FIG. 1 may be formed the same as the screen assembly 400, except that each expander member may have a plunger handle disposed perpendicularly away from the inner side of the screen's frame.

Figure 3:
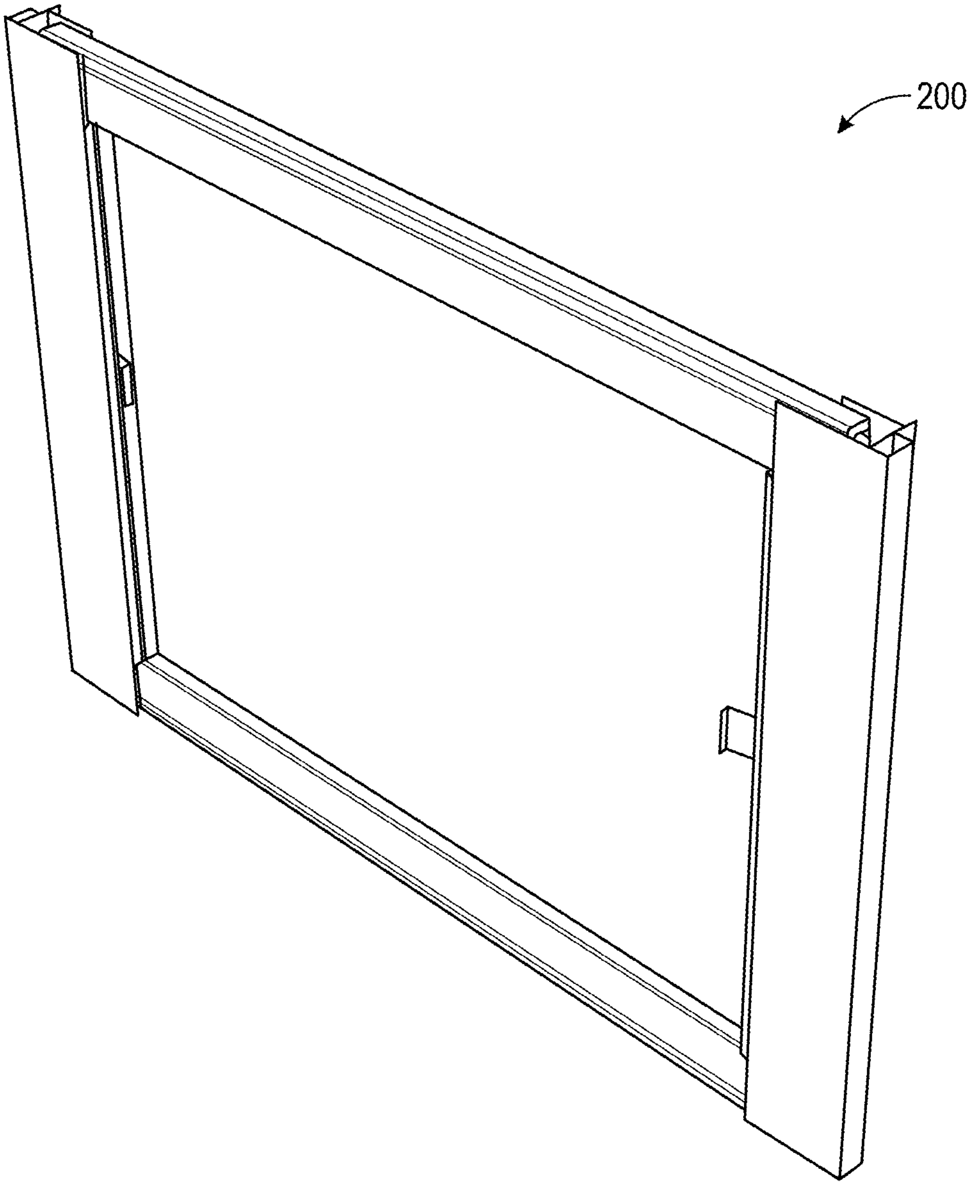
FIG. 3 is a perspective view showing a second embodiment of a screen assembly, as disclosed herein, having dual side expanders.
Figure 4:
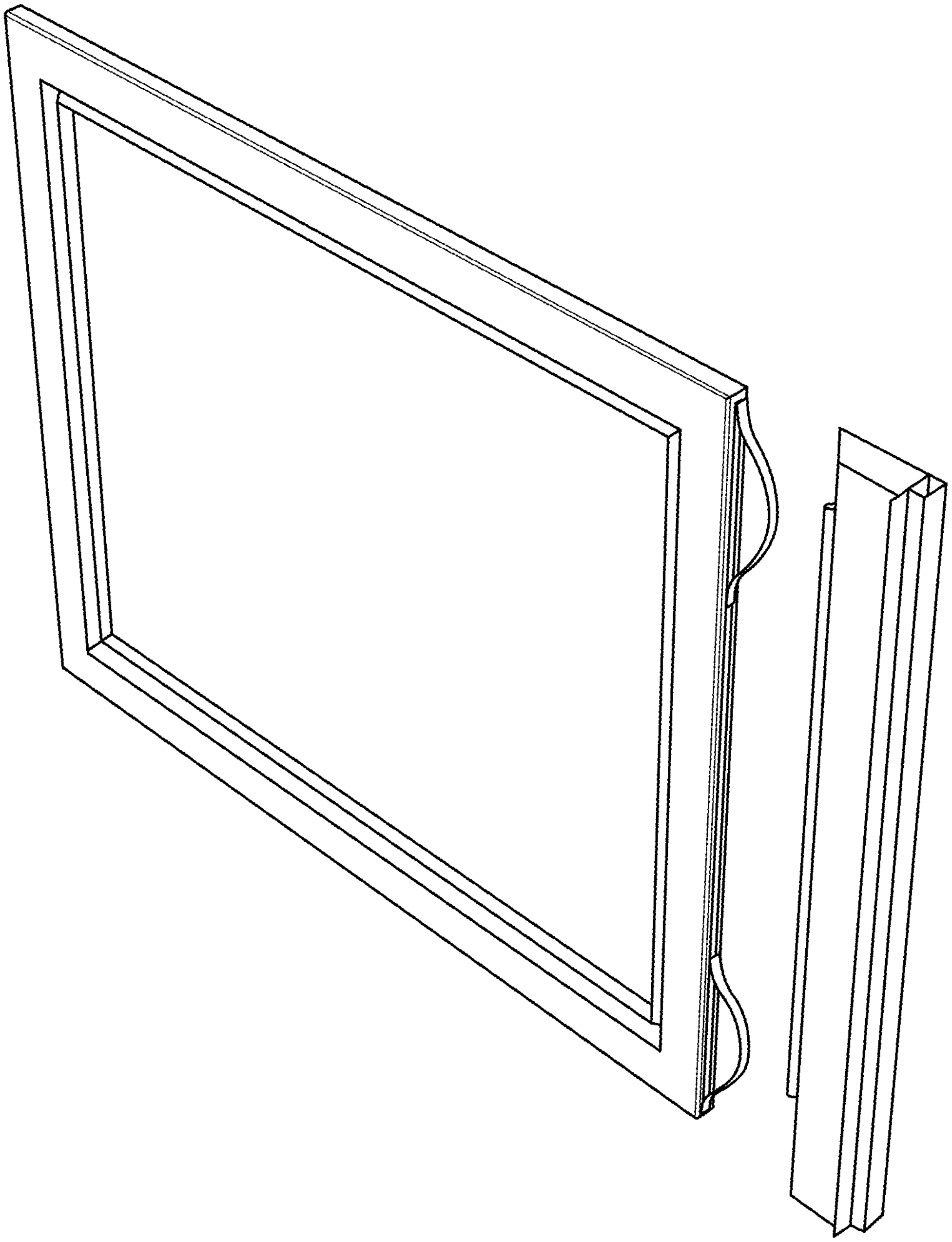
FIG. 4 is a partially exploded view of the screen assembly of FIG. 3, shown prior to one of the expander members being slidably attached to the frame of the screen.

The screen assembly 200 shown in FIG. 3 may be formed the same as the screen assembly 400, except that each expander member may have a small pull-tab as the handle to actuate the expander away from the window frame 99'.

The screen assembly 300 shown in FIG. 3 may be formed the same as the screen assembly 400, except that only one expander member may have a handle thereon.

Figure 12A:
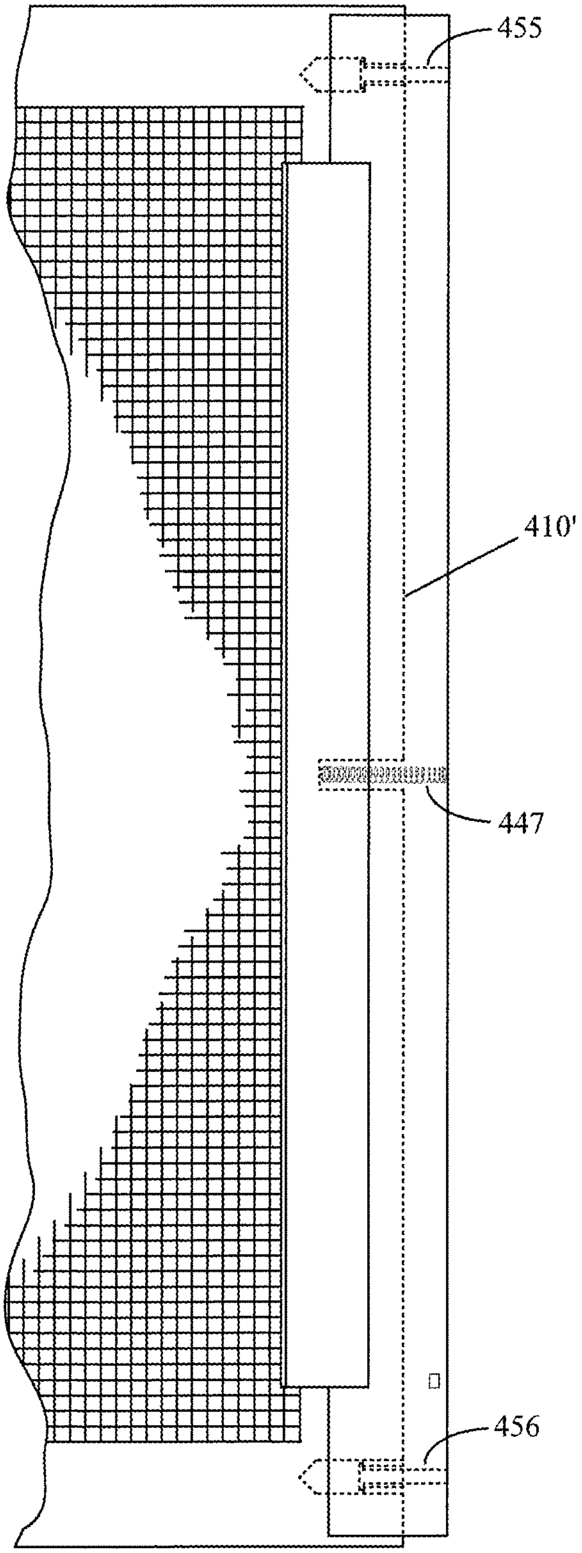
FIG. 12A is the detail view of FIG. 12, but which instead illustrates use of a compression spring for biasing of the expander member.

FIG. 12A is the detail view of FIG. 12, but which instead illustrates use of a helical compression spring 447 for biasing of the expander member. In addition, FIG. 12A shows the use of a dowel pin 455 that extends away from and protrudes into the channel section of the expander member. The dowel pin is configured to be received in a corresponding opening in the side of the frame 410'. To limit the biased movement of the expander member, the dowel pin 455 may have a head with a slightly larger diameter, which may contact a shoulder formed in the opening in the frame, as shown for the upper dowel pin in FIG. 12A. Alternatively, a bushing may be press fit into the opening in the frame to provide the shoulder, as shown for the lower dowel pin 456 in FIG. 12A.

The screen assembly 500 shown in FIG. 17 is formed similar to the screen assembly 400 shown in FIG. 11, but utilizes a different arrangement for mounting of the expander member to the frame, which also thereby serves to limit the extent to which it may be outwardly biased.

As seen in FIG. 17, the screen assembly 500 may include a frame 510, a piece of mesh material 520 that is secured to the frame, at least one expander member being slidably mounted to its left or right sides, and one or more springs 540 configured to bias each expander member into a fully extended position. FIG. 17 shows an expander member 530L mounted to the left side of the frame 510 and an expander member 530R mounted to the right side of the frame, with each expander member being biased by two leaf springs. Each expander member 530L and/or 530R that is utilized may be configured to slidably mount to the frame 510 in a first direction 500*i*, which in one embodiment may be perpendicular to the axial direction 500*ii* that it may be configured to slide when actuated to oppose the spring biasing or when being biased by the spring(s), during installation into or removal from the master frame of the window.

Figure 19:
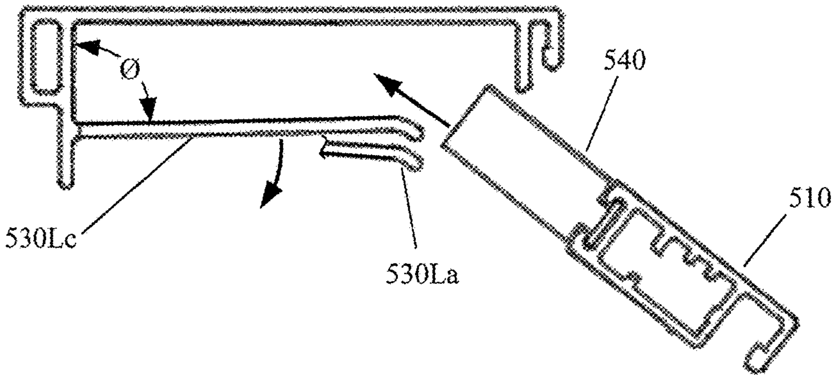
FIG. 19 shows an expander of the screen assembly of FIG. 17, which is not a closed cross-sectional shape and has an opening, permitting the expander to be slidably mounted onto the frame with a portion of the frame being received through the opening, until positioned as seen in FIG. 17A.
Figure 20A:
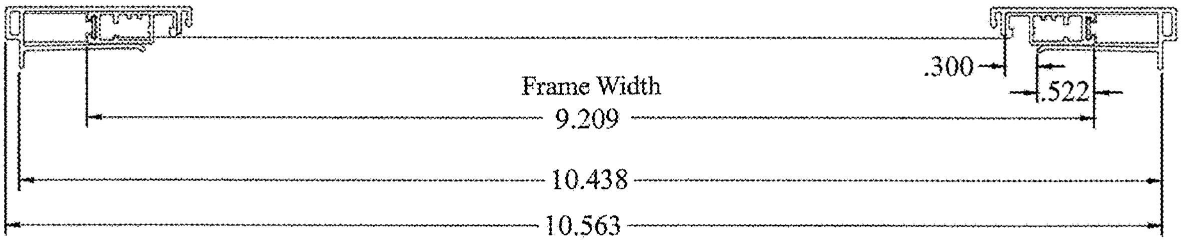
Figure 20B:
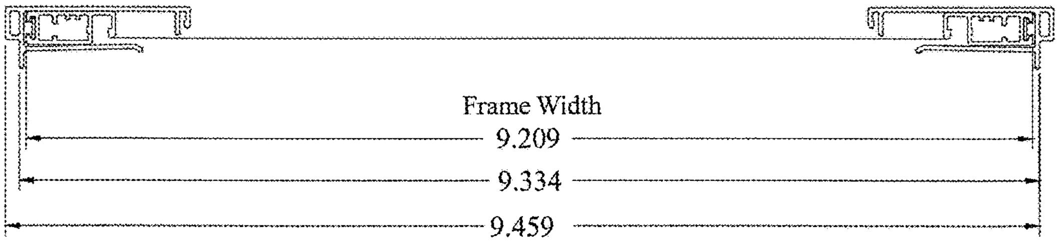

In another embodiment, the mounting direction may be generally as shown in FIG. 19 (i.e., in the same plane as the sliding direction for installation of the screen assembly), which may be accomplished by using a cross-section for the expander that is not a closed shape, and which instead may have one side 530Lc that is cantilevered and falls short of the adjacent side to create an opening. The one side 530Lc may be cantilevered and may act like a spring clip. The one side 530Le may also terminate in an curved/angled portion 530La, which may better facilitate deflection of the cantilevered side and sliding of the frame through that opening to be retained within the cross-section of the expander member, as seen in FIG. 19.

A cross-sectional view of the left side of the screen assembly 500 of FIG. 17 is shown enlarged in FIG. 17A and FIG. 18. FIG. 17A is a cross-sectional view shown with the expander 530L in the fully extended position. FIG. 18 is a cross-sectional view shown with the expander 530L in the fully retracted position.

It is noted that use of the herein described expander assemblies on all four sides of the frame of the screen is also contemplated, as they may be configured to travel without interfering with each other, by being positioned at different levels, or by having the ends of each expander member formed at a 45 degree angle, with sufficient gaps formed therebetween.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A screen assembly, said screen assembly comprising:
- a frame including a first side, a second side, a third side, and a fourth side, wherein the first side meets the third side at a first upper corner, the first side meets the fourth side at a first lower corner, the second side meets the third side at a second upper corner, and the second side meets the fourth side at a second lower corner;
- a mesh, said mesh being secured to said frame;
- a first expander member, said first expander member being mounted to the first side of said frame, and thereat configured to slide with respect to said frame between a first expander member fully retracted position, a first expander member fully extended position, and a plurality of first expander member intermediate positions between said first expander member fully retracted position and said first expander member fully expanded position, wherein a portion of the first expander member comprises a cantilevered spring clip that deflects to allow attachment of the first expander member to the first side of the frame;
- a second expander member, said second expander member being mounted to the second side of said frame, and thereat configured to slide with respect to said frame between a second expander member fully retracted position, a second expander member fully extended position, and a plurality of second expander member intermediate positions between said second expander member fully retracted position and said second expander member fully expanded position;

a first leaf spring disposed between the first side of the frame and the first expander member, the first leaf spring comprising:

a first end, said first end comprising: a hook and an extension;

wherein said hook is configured to secure said first end of said first leaf spring to said first side of said frame, said hook at said first end of said first leaf spring being secured proximate to an upper end of said first side of said frame;

wherein said hook and said extension are configured to inhibit lateral movement of said first end of said first leaf spring relative to said frame in each of a direction towards said upper end of said first side of said frame and a direction towards a lower end of said first side of said frame; and a second end, said second end comprising: a concave shape configured to bear against a side of said frame between said upper end of said first side of said frame and said lower end of said first side of said frame, and configured to slide against said first side of said frame when said first leaf spring is compressed;

wherein said first leaf spring is configured to bias an upper end of said first expander member toward said first expander member fully extended position;

a second leaf spring disposed between the first side of said frame and the first expander member, the second leaf spring comprising:

a first end, said first end of said second leaf spring comprising:

a hook and an extension;

wherein said hook of said second leaf spring is configured to secure said first end of said second leaf spring to said first side of said frame, said hook at said first end of said second leaf spring being secured proximate to said lower end of said first side of said frame away from first lower corner;

wherein said hook and said extension of said second leaf spring are configured to inhibit lateral movement of said first end of said first leaf spring relative to said frame in each of a direction towards said lower end of said first side of said frame and a direction towards said upper end of said first side of said frame; and a second end, said second end of said second leaf spring comprising: a concave shape configured to bear against said first side of said frame between said second end of said first leaf spring and said lower end of said first side of said frame, and being configured to slide against said first side of said frame when said second leaf spring is compressed;

wherein said second leaf spring is configured to bias a lower end of said first expander member toward said first expander member fully extended position;

a third leaf spring disposed between the second side of said frame and the second expander member to bias an upper end of said second expander member away from the second side of said frame;

a fourth leaf spring disposed between the second side and the second expander member to bias a lower end of said second expander member away from the second side of said frame;

wherein a lateral distance across said screen assembly between distal sides of said first expander member and said second expander member, when said first expander member is in said first expander member fully retracted position and said second expander member is in said second expander member fully retracted position and each of said first leaf spring, said second leaf spring, said third leaf spring, and said fourth leaf spring are compressed, permits insertion and placement of said screen assembly into a window socket of a master window frame; and wherein a lateral distance across said screen assembly between the distal sides of said first expander member and said second expander member when said first expander member is thereafter biased into one of said plurality of first expander member intermediate positions and second expander member is thereafter biased into one of said plurality of second expander member intermediate positions, permits retention of at least a portion of said first expander member in a first side of said window socket and retention of said second expander member in a second side of the window socket.

2. The screen assembly according to claim 1, wherein said first expander member is configured to slide between said first expander member fully retracted position and each of said plurality of first expander member intermediate positions and said second expander member is configured to slide between said second expander member fully retracted position and each of said plurality of second expander member intermediate positions to permit installation in various different sized windows having various different window socket dimensions.

3. The screen assembly according to claim 2, wherein a length of said first expander member is the same as a length of said first side of said frame.

4. The screen assembly according to claim 3, wherein said first expander member comprises a handle extending perpendicular to a sliding direction of the first expander member relative to the frame for a distance that is greater than a distance between the first leaf spring and the second leaf spring, said handle configured to be graspable by a hand of a user to permit actuation of said first expander member to oppose said bias of said first leaf spring and said second leaf spring, to permit installation of said screen assembly in the window socket of the master window frame.

5. The screen assembly of claim 1, wherein said hook at said first end of said first leaf spring is secured proximate to the upper end of said first side of said frame away from said first upper corner and wherein said hook at said first end of said second leaf spring is secured proximate to the lower end of said first side of said frame away from said first lower corner.

6. The screen assembly of claim 1, wherein the first expander member is open at one or more of the upper end of said first expander member or the lower end of said first expander member to receive the first side of the frame in a direction perpendicular to an axial direction of said first expander member and is configured to slide when actuated to oppose said first leaf spring and said second leaf spring.

7. The screen assembly of claim 1, wherein the first expander member is formed as a first channel member having a first expander member first leg and a first expander member second leg connected by a first expander member third leg, wherein the first leaf spring and the second leaf spring are disposed between facing surfaces of the first side of said frame and the first expander member third leg.

8. The screen assembly of claim 7, wherein the first expander member third leg is shorter than the first expander member first leg and the first expander member second leg.

9. The screen assembly of claim 7, wherein the second expander member is formed as a second channel member having a second expander member first leg and a second expander member second leg connected by a second expander member third leg, wherein the third leaf spring and the fourth leaf spring are disposed between facing surfaces of the second side of said frame and the second expander member third leg.

* * * * *